United States Patent
Kim et al.

(10) Patent No.: US 8,156,823 B2
(45) Date of Patent: Apr. 17, 2012

(54) 6-AXIS SENSOR STRUCTURE USING FORCE SENSOR AND METHOD OF MEASURING FORCE AND MOMENT THEREWITH

(75) Inventors: Jong Ho Kim, Daejeon (KR); Hyun Joon Kwon, Seoul (KR); Dong-ki Kim, Gwangju-si (KR)

(73) Assignee: Korea Research Institute of Standards and Science, Daejeon (KR)

( * ) Notice: Subject to any disclaimer, the term of this patent is extended or adjusted under 35 U.S.C. 154(b) by 287 days.

(21) Appl. No.: 12/651,007

(22) Filed: Dec. 31, 2009

(65) Prior Publication Data

US 2011/0107850 A1    May 12, 2011

(30) Foreign Application Priority Data

Nov. 9, 2009   (KR) .................. 10-2009-0107283

(51) Int. Cl.
*G01D 7/00*     (2006.01)
(52) U.S. Cl. .............................. 73/862.041; 73/862.043
(58) Field of Classification Search ........ 73/862.041–862.046
See application file for complete search history.

(56) References Cited

U.S. PATENT DOCUMENTS

| | | | | |
|---|---|---|---|---|
| 4,047,338 A | * | 9/1977 | Gormish et al. | 451/1 |
| 4,448,083 A | * | 5/1984 | Hayashi | 73/862.042 |
| 4,550,617 A | * | 11/1985 | Fraignier et al. | 73/862.042 |
| 4,823,618 A | * | 4/1989 | Ramming | 73/862.045 |
| 5,402,684 A | * | 4/1995 | Engeler et al. | 73/794 |
| 6,349,604 B1 | * | 2/2002 | Byun et al. | 73/862.043 |
| 6,354,155 B1 | * | 3/2002 | Berme | 73/862.043 |
| 6,871,552 B2 | * | 3/2005 | Liu et al. | 73/862.041 |
| 6,990,867 B2 | * | 1/2006 | Okada | 73/780 |
| 7,219,561 B2 | * | 5/2007 | Okada | 73/862.043 |
| 7,779,705 B2 | * | 8/2010 | Mastinu et al. | 73/862.381 |

* cited by examiner

*Primary Examiner* — Max Noori
(74) *Attorney, Agent, or Firm* — Thomas R. FitzGerald, Esq.; Hiscock & Barclay, LLP (57) ABSTRACT

A 6-axis force sensor includes bumper 10 with bumper axis 12 and press member 11 which has four horizontal beams 11a, 11b, 11c and 11d in a cross shape with end, side and bottom faces. Sensors 31, 32, 33, and 34 on end faces sense force in one direction and sense a moment acting on opposite end faces. Sensors 41, 42, 43, and 44 on side faces sense force in a second direction transverse to the first direction and sense a moment acting on opposite side faces. A film 20 on the bottom faces has four sensors 21, 22, 23, and 24, one on each bottom face, for sensing force in a direction transverse to the first and the second directions and sensing a moment acting on opposite sensors on the film.

23 Claims, 9 Drawing Sheets

6-AXIS SENSOR STRUCTURE USING FORCE SENSOR AND METHOD OF MEASURING FORCE AND MOMENT THEREWITH

CROSS-REFERENCE TO RELATED APPLICATIONS

This application claims priority to Korean Patent Application Number 10-2009-0107283 filed Nov. 9, 2009, the entire disclosure of which is hereby incorporated by reference.

BACKGROUND OF THE INVENTION

1. Field of the Invention

The present invention relates to a 6-axis force sensor structure using a force sensor and a method of measuring force and moment therewith. More particularly, the invention relates to a 6-axis force sensor structure which generates electric signals corresponding to forces of 3 axes and the moments of 3 axes using a uniaxial force sensor film having force sensor distribution and a cross-shaped press member and a method of measuring forces and moments of 6 axes using the 6-axis force sensor structure.

2. Background of the Related Art

Most conventional uniaxial/multiaxial load cells use a strain gauge. However, the manufacturing cost of the strain gauge is as high as more than $100 and mass production of the strain gauge is difficult to achieve because the strain gauge is manually manufactured.

Furthermore, the variance of manufactured load cells is considerably large and a resistance variation due to a force is very small, for example, 1 to 2Ω, to result in a small signal variation, and thus it requires high cost to manufacture a signal processing unit and the volume of the signal processing unit increases. For instance, the signal processing unit requires $1,000 for each axis, that is, a total of $3,000, to process forces and moments of 3 axes.

Due to the aforementioned shortcomings, the load cells are difficult of access although they have a variety of applications. Accordingly, a new uniaxial/multiaxial load cell that can be easily manufactured and mass-produced to replace the conventional uniaxial/multiaxial load cells is needed.

Recently, a force sensor has been manufactured using a sensing unit that combines a small pressure sensor and a pressure transfer liquid and gel instead of the strain gauge. However, the sensing unit is difficult to design and manufacture because the sensing unit must be sealed up. Furthermore, the force sensor cannot secure reliability when tension is applied thereto while the force sensor has reliability when compressed. Moreover, the force sensor is difficult to measure a moment although it can measure simple tension when using a liquid and gel. Accordingly, a sensing unit in the form of a membrane is required in order to improve durability against tension and compression. However, the sensitivity of the force sensor using the sensing unit in the form of a membrane decreases since the membranous sensing unit has a small variation within a small load range although it has a large variation within a large load range, and thus the force sensor using the membranous sensing unit is not suitable as a uniaxial/multiaxial force sensor. Accordingly, a new sensing unit that is robust to tension and compression and is easily combined with an external structure while reducing loss of force is needed in order to use a force sensor in the form of a film as a uniaxial/multiaxial force sensor.

SUMMARY OF THE INVENTION

Accordingly, the present invention has been made in view of the above-mentioned problems occurring in the prior art, and it is a primary object of the present invention to provide a 6-axis force sensor structure using a uniaxial force sensor film which is easily manufactured and requires low manufacturing cost, such as a contact resistant film, a capacitive film and piezoelectric film, and a method of measuring force and moment with the 6-axis force sensor structure.

It is a second object of the present invention to provide a 6-axis force sensor structure using a uniaxial force sensor film which can be manufactured through a mass production method such as a screen printing process and a flexible printed circuit board (FPCB) process and has a considerably small measurement variation and a large signal variation, and a method of measuring force and moment with the 6-axis force sensor structure.

It is a third object of the present invention to provide a 6-axis force sensor structure using a uniaxial force sensor film, which can easily process signals and can be miniaturized, and a method of measuring force and moment with the 6-axis force sensor structure.

To accomplish the above objects of the present invention, according to the present invention, there is provided a 6-axis force sensor structure using a force sensor, which has 3-axis force directions and 3-axis moment directions, comprising a bumper 10 including a bumper axis 12 receiving an external force and a press member 11 which has four horizontal beams 11a, 11b, 11c and 11d in a cross shape, is connected to the bottom of the bumper axis 12 and receives the external force; a force sensor film for measuring uniaxial force and 2-axial moments, which is composed of a first force sensor film 20 that is located under the press member 11 and has force sensors 21, 22, 23 and 24 distributed in at least four regions; a force sensor film for measuring 2-axis forces, which is composed of second, third, fourth and fifth force sensor films 31, 32, 33 and 34 that are respectively located on the vertical faces of the ends of the four horizontal beams 11a, 11b, 11c and 11d and respectively have individual force sensor distributions; a force sensor film for measuring uniaxial moment, which is composed of sixth, seventh, eighth and ninth force sensor films 41, 42, 43 and 44 that are respectively located on the vertical faces of the sides of the two horizontal beams 11a and 11c having the same central axes among the four horizontal beams 11a, 11b, 11c and 11d and respectively have individual force sensor distributions; a pad 50 located between the press member 11 and the first force sensor film 20; a lower plate 60 which is located under the first force sensor film 20 and reacts upon the external force; and an upper plate 70 which comes into contact with the lower plate 60 at the edges thereof, has a first hole 71 for exposing the top of the bumper axis 12 to the outside and a second hole 72 through which signal input/output lines connected to the force sensor films 20, 31, 32, 33, 34, 41, 42, 43 and 44 are drawn out, and is located on the bumper 10 to receive the force sensor films 20, 31, 32, 33, 34, 41, 42, 43 and 44 and the bumper 10, having a predetermined gap between the upper plate 70 and the force sensor films 20, 31, 32, 33, 34, 41, 42, 43 and 44 and the bumper 10.

The upper plate 70 and the lower plate 60 may be manufactured using a metal or a polymer.

The first force sensor film 20 may have the four force sensors 21, 22, 23 and 24 respectively arranged in directions perpendicular to each other.

The force sensor films 20, 31, 32, 33, 34, 41, 42, 43 and 44 may be contact resistant films, capacitive films or piezoelectric films.

The bumper 10 may be made of a metal or a polymer.

The pad 50 may be a silicon pad or a polymer pad.

The upper plate 70 may be combined with the lower plate 60 using bolts 61 fitted into a plurality of screw holes formed at the edge of the lower plate 60 or adhere to the bottom plate 70 using an adhesive.

The upper plate 70 may have a recessed structure fitted to the shapes of the press member 11 and the bumper axis 12, the vertical face of the outer side of the press member 11 may form a first gap 81 with the vertical face of the inner side of the upper plate 70, which faces the vertical face of the outer side of the press member 11, the vertical face of the outer side of the bumper axis 12 may form a second gap 82 with the vertical face of the inner side of the upper plate 70, which faces the vertical face of the outer side of the bumper axis 12, and the horizontal face of the outer side of the press member 11, which faces the horizontal face of the inner side of the upper plate 70, may form a third gap 83 with the horizontal face of the inner side of the upper plate 70.

The first gap 81 and the second gap 82 may correspond to 0.1 mm or more.

The third gap 83 may correspond to 0.1 mm or more.

The first force sensor film 20 may be fitted to the bottom face of the press member 11 and have the same size as the bottom face of the press member 11.

The force sensor film for measuring 1-axial force and 2-axis moments may further comprise a tenth force sensor film 90 which is located between the upper plate 70 and the top face of the press member 11 and has force sensors 91, 92, 93 and 94 distributed in at least four regions.

The tenth force sensor film 90 may have the force sensors 91, 92, 93 and 94 respectively arranged in directions perpendicular to each other, and the force sensor distributions of the first force sensor film 10 may vertically correspond to the force sensor distributions of the tenth force sensor film 90.

To accomplish the above objects of the present invention, according to the present invention, there is provided a method of measuring forces and moments according to a 6-axis force sensor structure, comprising a first transfer step S100 in which a bumper axis 12 exposed to the outside through a first hole 71 formed in an upper plate 70 receives an external force; a second transfer step S110 in which a press member 11 which is connected to the bottom of the bumper axis 12 and has four horizontal beams 11a, 11b, 11c and 11d in a cross shape receives the external force from the bumper axis 12; a third transfer step S120 in which a first force sensor film 20 which is located under the press member 11 and has at least four force sensor distributions and second through ninth force sensor films 31, 32, 33, 34, 41, 42, 43 and 44 respectively located on the vertical faces of the ends and the vertical faces of the sides of the four horizontal beams 11a, 11b, 11c and 11d receive the external force; a step S130 in which force sensors of the force sensor films 20, 31, 32, 33, 34, 41, 42, 43 and 44 respectively output electric signals corresponding components of the external force; a step S140 in which a calculating means receives the electric signals through signal input/output lines connected to the force sensor films 20, 31, 32, 33, 41, 42, 43 and 44; and a step S150 in which the calculating means calculates 3-axis forces and 3-axis moments according to the external force based on the electric signals.

When the calculating means calculates a uniaxial force in the step S150, the calculating means may calculate Fz according to the following equation $$Fz = F_1 + F_2 + F_3 + F_4$$

where Fz represents the magnitude of force in the axial direction of the bumper axis 12 and $F_1$, $F_2$, $F_3$ and $F_4$ respectively denote magnitudes of forces applied to force sensors 21, 22, 23 and 24 of the first force sensor film 20.

When the calculating means calculates 2-axis moments in the step S150, the calculating means may calculate Mx and My according to the following equations $$Mx = (F_4 - F_2)a, \ My = (F_1 - F_3)b$$

where Mx represents the magnitude of moment based on an arbitrary X-axis formed by the horizontal beams 11a and 11c having the same central axis among the four horizontal beams 11a, 11b, 11c and 11d, $F_4$ and $F_2$ respectively denote the magnitudes of forces applied to the fourth force sensor 24 and the second force sensor 22 which are arranged symmetrically based on the center of the bumper axis 12 on the first force sensor film 20, a represents a distance between the center of the bumper axis 12 and the second force sensor 22, My denotes the magnitude of moment based on a y-axis, which is perpendicular to the x-axis and is formed by the horizontal beams 11b and 11d among the four horizontal beams 11a, 11b, 11c and 11d, $F_1$ and $F_3$ respectively denote the magnitudes of forces applied to the first force sensor 21 and the third force sensor 23 which are arranged symmetrically based on the center of the bumper axis 12 and perpendicularly to a line connecting the fourth force sensor 24 and the second force sensor 22, and b represents a distance between the center of the bumper axis 12 and the first force sensor 21.

When the calculating means calculates 2-axis forces, the calculating means may calculate Fx and Fy according to the following equations $$Fx = F_9 - F_{10}, \ Fy = F_{11} - F_{12}$$

where Fx represents the magnitude of force applied to an x-axis formed by the horizontal beams 11a and 11c having the same central axis in the length direction among the four horizontal beams 11a, 11b, 11c and 11d, $F_9$ and $F_{10}$ respectively denote the magnitudes of forces applied to the force sensor films 31 and 33 which are located on the vertical faces of both ends of the x-axis and face each other, Fy represents the magnitude of force applied to a y-axis, which is perpendicular to the x-axis and is formed by the horizontal beams 11b and 11d among the four horizontal beams 11a, 11b, 11c and 11d, and $F_{11}$ and $F_{12}$ respectively denote the magnitudes of forces applied to the force sensor films 32 and 34 which are located on the vertical faces of both ends of the y-axis and face each other.

When the calculating means calculates uniaxial moment, the calculating means may calculate Mz according to the following equation $$Mz = (F_{13} - F_{15})a + (F_{14} - F_{16})a$$

where Mz represents the magnitude of moment having the center of the bumper axis 12 as a z-axis, $F_{13}$, $F_{14}$, $F_{15}$ and $F_{16}$ respectively denote the magnitudes of forces applied to the force sensor films 41, 42, 43 and 44 respectively located on the vertical faces of the sides of the horizontal beams 11a and 11c having the same central axis in the length direction among the fourth horizontal beams 11a, 11b, 11c and 11d, $F_{13}$ and $F_{15}$ having lines of action, which correspond to each other, $F_{14}$ and $F_{16}$ having lines of actions, which correspond to each other, and a represents a distance between the bumper axis 12 and the centers of the force sensor films 41, 42, 43 and 44.

To accomplish the above objects of the present invention, according to the present invention, there is also provided a method of measuring forces and moments according to a 6-axis force sensor structure, comprising a first transfer step S200 in which a bumper axis 12 exposed to the outside through a first hole 71 formed in an upper plate 70 receives an external force; a second transfer step S210 in which a press member 11 which is connected to the bottom of the bumper axis 12 and has four horizontal beams 11a, 11b, 11c and 11d in a cross shape receives the external force from the bumper axis 12; a third transfer step S220 in which a first force sensor film 20 which is located under the press member 11 and has force sensors 21, 22, and 24 distributed in at least four regions, a tenth force sensor film 90 which is located on the press member 11 and has the same force sensor distribution as that of the first force sensor film 20, and second through ninth force sensor films 31, 32, 33, 34, 41, 42, 43 and 44 respectively located on the vertical faces of the ends and the vertical faces of the sides of the four horizontal beams 11a, 11b, 11c and 11d receive the external force; a step S230 in which force sensors of the force sensor films 20, 31, 32, 33, 34, 41, 42, 43, 44 and 90 respectively output electric signals corresponding components of the external force; a step S240 in which a calculating means receives the electric signals through signal input/output lines connected to the force sensor films 20, 31, 32, 33, 41, 42, 43, 44 and 90; and a step S250 in which the calculating means calculates 3-axis forces and 3-axis moments according to the external force based on the electric signals.

When the external force corresponds to a compressive force or a tensile force applied to the bumper axis 12 and the calculating means calculates a uniaxial force in the step S250, the calculating means may calculate $F_{-z}$ or $F_{+z}$ according to the following equations $$F_{-z}=F_1+F_2+F_3+F_4, F_{+z}=F_5+F_6+F_7+F_8$$

where $F_{-z}$ represents the magnitude of force in a compressive direction of the bumper axis 12, $F_1$, $F_2$, $F_3$ and $F_4$ respectively denote the magnitudes of forces applied to the force sensors 21, 22, 23 and 24 on the first force sensor film 20, $F_{+z}$ represents the magnitude of force in a tensile direction of the bumper axis 12, and $F_5$, $F_6$, $F_7$ and $F_8$ respectively denote the magnitudes of forces applied to the force sensors 91, 92, 93 and 94 on the tenth force sensor film 90.

When the external force corresponds to a compressive force or a tensile force applied to the bumper axis 12 and the calculating means calculates 2-axis moments in the step S250, the calculating means may calculate Mx and My according to the following equations $$Mx=(F_4-F_2)a+(F_6-F_8)a$$

$$My=(F_1-F_3)a+(F_7-F_5)a$$

where Mx represents the magnitude of moment based on an x-axis formed by the horizontal beams 11a and 11c having the same central axis among the four horizontal beams 11a, 11b, 11c and 11d, $F_1$, $F_2$, $F_3$ and $F_4$ respectively denote the magnitudes of forces applied to the first, second, third and fourth force sensors 21, 22, 23 and 24 which are arranged on the first force sensor film 20 at an equal distance a from the center of the bumper axis 10 and at an equal angle of 90°, My represents the magnitude of moment based on a y-axis, which is perpendicular to the x-axis and is formed by the horizontal beams 11b and 11d among the four horizontal beams 11a, 11b, 11c and 11d, and $F_5$, $F_6$, $F_7$ and $F_8$ respectively denote the magnitudes of forces applied to the fifth, sixth, seventh and eighth force sensors 91, 92, 93 and 94 which are arranged on the tenth force sensor film 90 at the equal distance a from the center of the bumper axis 12 and at an equal angle of 90° and respectively correspond to the first, second, third and fourth force sensors 21, 22, 23 and 23 in the vertical direction.

When the calculating means calculates 2-axis forces in the step S250, the calculating means may calculate Fx and Fy according to the following equations $$Fx=F_9-F_{10}, Fy=F_{11}-F_{12}$$

where Fx represents the magnitude of force applied to an x-axis formed by the horizontal beams 11a and 11c having the same central axis in the length direction among the four horizontal beams 11a, 11b, 11c and 11d, $F_9$ and $F_{10}$ respectively denote the magnitudes of forces applied to the force sensor films 31 and 33 which are located on the vertical faces of both ends of the x-axis and face each other, Fy represents the magnitude of force applied to a y-axis, which is perpendicular to the x-axis and is formed by the horizontal beams 11b and 11d among the four horizontal beams 11a, 11b, 11c and 11d, and $F_{11}$ and $F_{12}$ respectively denote the magnitudes of forces applied to the force sensor films 32 and 34 which are located on the vertical faces of both ends of the y-axis and face each other.

When the calculating means calculates uniaxial moment in the step S250, the calculating means may calculate Mz according to the following equation $$Mz=(F_{13}-F_{15})a+(F_{14}-F_{16})a$$

where Mz represents the magnitude of moment having the center of the bumper axis 12 as a z-axis, $F_{13}$, $F_{14}$, $F_{15}$ and $F_{16}$ respectively denote the magnitudes of forces applied to the force sensor films 41, 42, 43 and 44 respectively located on the vertical faces of the sides of the horizontal beams 11a and 11c having the same central axis in the length direction among the fourth horizontal beams 11a, 11b, 11c and 11d, $F_{13}$ and $F_{15}$ having lines of action, which correspond to each other, $F_{14}$ and $F_{16}$ having lines of actions, which correspond to each other, and a represents a distance between the bumper axis 12 and the centers of the force sensor films 41, 42, 43 and 44.

According to the present invention, the multiaxial force sensor structure using a uniaxial force sensor in the form of a film is easily manufactured and requires low manufacturing cost because manufacturing methods such as contact resistance type, capacitance type and piezoelectric methods are used to manufacture the force sensor structure.

Furthermore, a measurement variation is considerably small and a signal variation due to force is as large as hundreds Ω because a mass-production method such as the screen printing and FPCB process is used to manufacture the multiaxial force sensor structure, and thus the multiaxial force sensor structure does not require amplification.

Moreover, the multiaxial force sensor structure easily processes signals, and thus a small-sized force sensor structure can be achieved.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

First Embodiment

Figure 1:
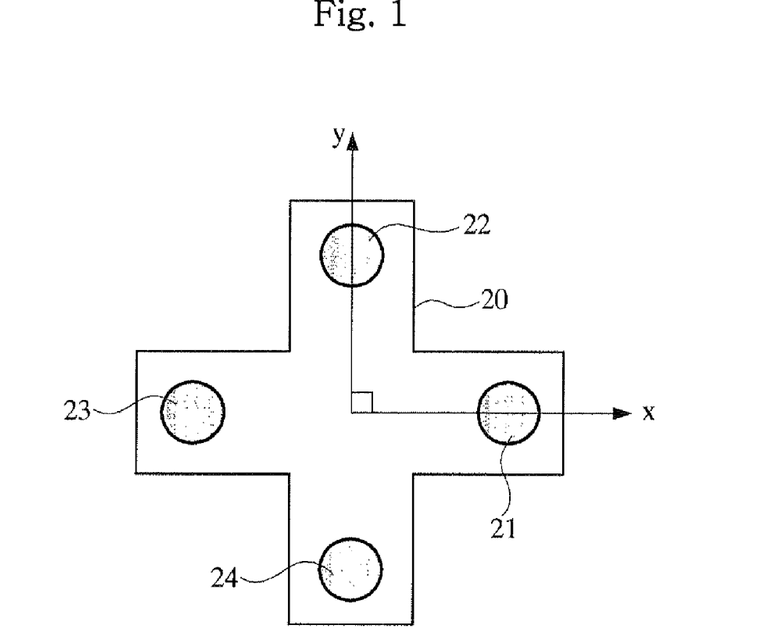
FIG. 1 is a plan view showing a cross-shaped first force sensor film and force sensor distribution in a 6-axis force sensor structure using a force sensor according to an embodiment of the present invention.

FIG. 1 is a plan view showing a cross-shaped first force sensor film 20 and a force sensor distribution in a 6-axis force sensor structure using a force sensor according to an embodiment of the present invention. The first force sensor film 20 having distribution of force sensors 21, 22, 23 and 24 is configured to generate electric signals respectively corresponding to uniaxial force and 2-axis moments and output the electric signals to a predetermined calculating means (not shown).

As shown in FIG. 1, the cross-shaped first force sensor film 20 has the force sensors 21, 22, 23 and 23 distributed in at least four ranges. The force sensors 21, 22, 23 and 24 are respectively arranged on four ends (at distances a and b from the intersecting point of ±x axis and ±y axis) of the cross-shaped the first force sensor film 20 in perpendicular directions (directions of ±x axis and directions of ±y axis perpendicular to ±x axis) and measure uniaxial force and 2-axis moments which will be described later. The force sensors 21, 22, 23 and 24 may be uniformly distributed in more than four ranges.

The first force sensor film 20 may use one of films fabricated through a contact resistance method, a capacitance method and a piezoelectric method.

Figure 2:
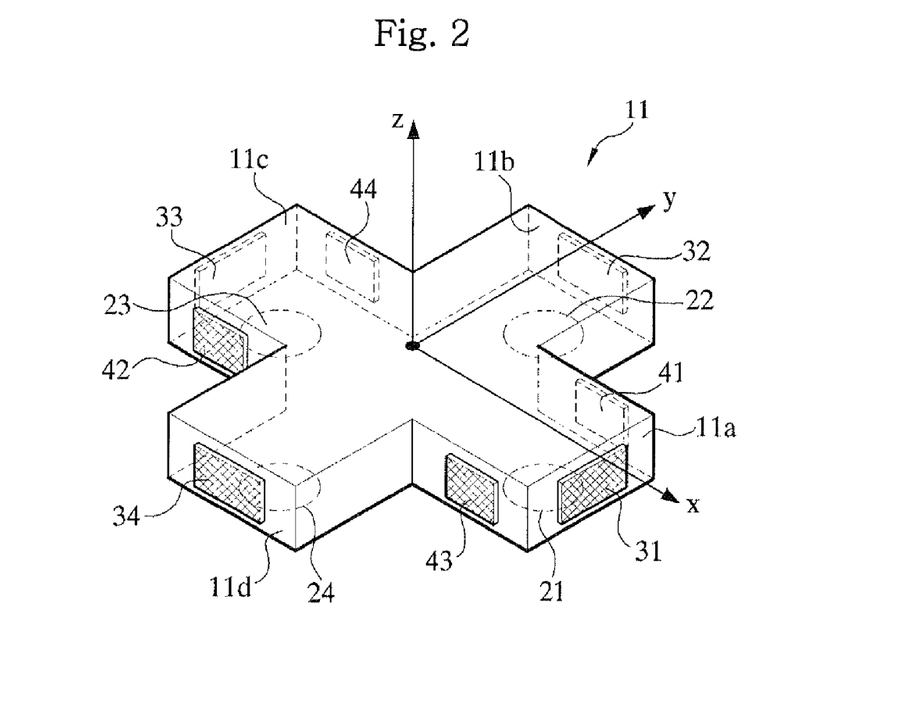
FIG. 2 shows location of force sensor films on a press member of a cross-shaped bumper of the 6-axis force sensor structure according to a first embodiment of the present invention.

FIG. 2 shows location of force sensor films 20, 31, 32, 33, 34, 41, 42, 43 and 44 on a press member 11 of a cross-shaped bumper 10 of a 6-axis force sensor structure according to a first embodiment of the present invention. Referring to FIG. 2, the press member 11 includes four horizontal beams 11a, 11b, 11c and 11d in a cross shape. The first force sensor film 20 for measuring uniaxial force and 2-axis moments is placed on the bottom face of the press member 11. The second, third, fourth and fifth force sensor films 31, 32, 33 and 34 for measuring 2-axis forces are respectively located on the vertical faces of the ends of the horizontal beams 11a, 11b, 11c and 11d. The sixth, seventh, eighth and ninth force sensor films 41, 42, 43 and 44 for measuring uniaxial moment are respectively placed on the vertical faces of the sides of the horizontal beams 11a and 11c having the same central axis among the four horizontal beams 11a, 11b, 11c and 11d. A method of measuring 3-axis forces and 3-axis moments using the sixth, seventh, eighth and ninth force sensor films 41, 42, 43 and 44 will be explained later.

Figure 3:
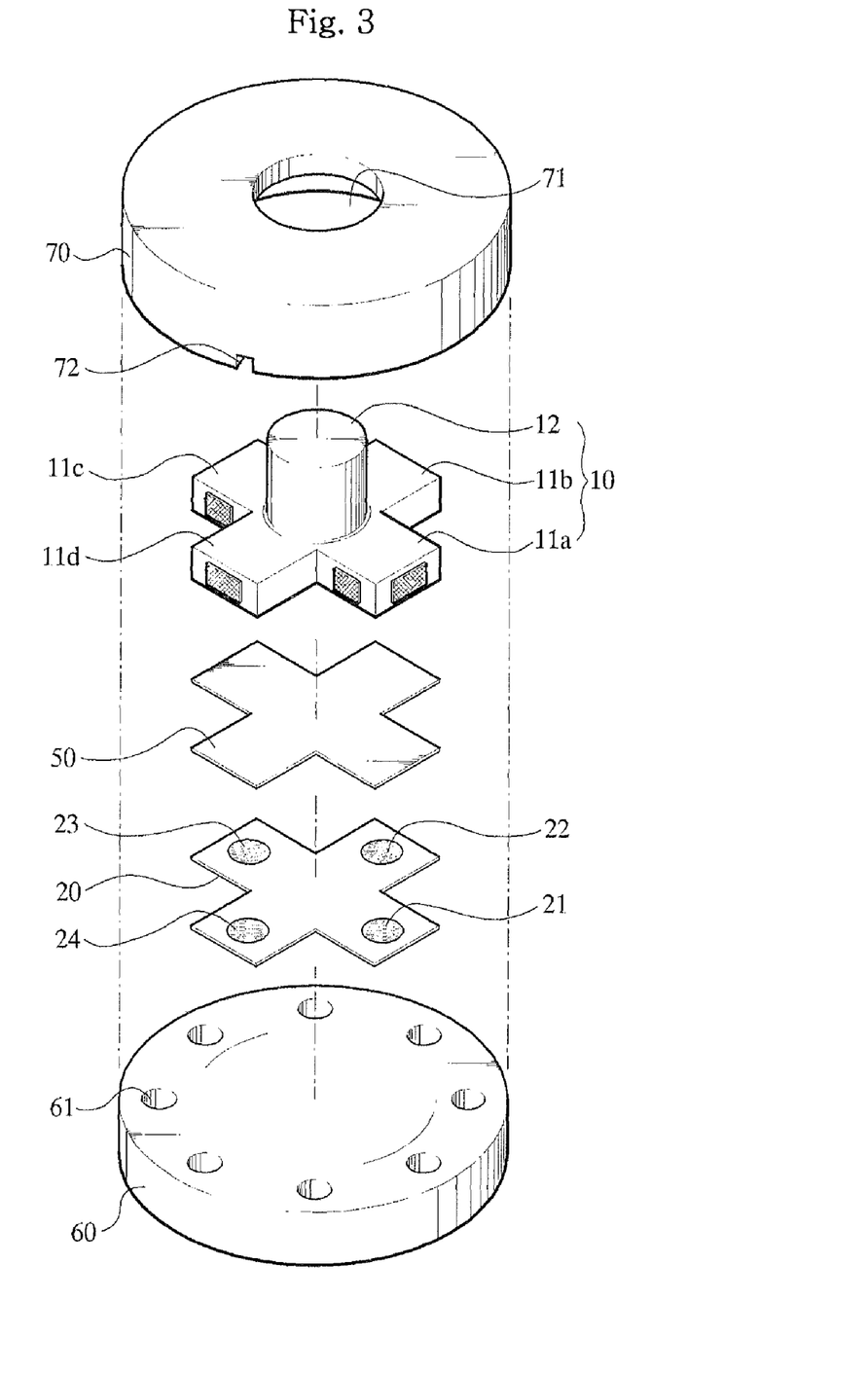
FIG. 3 is an exploded perspective view of the 6-axis force sensor structure according to the first embodiment of the present invention, viewed downward.
Figure 4:
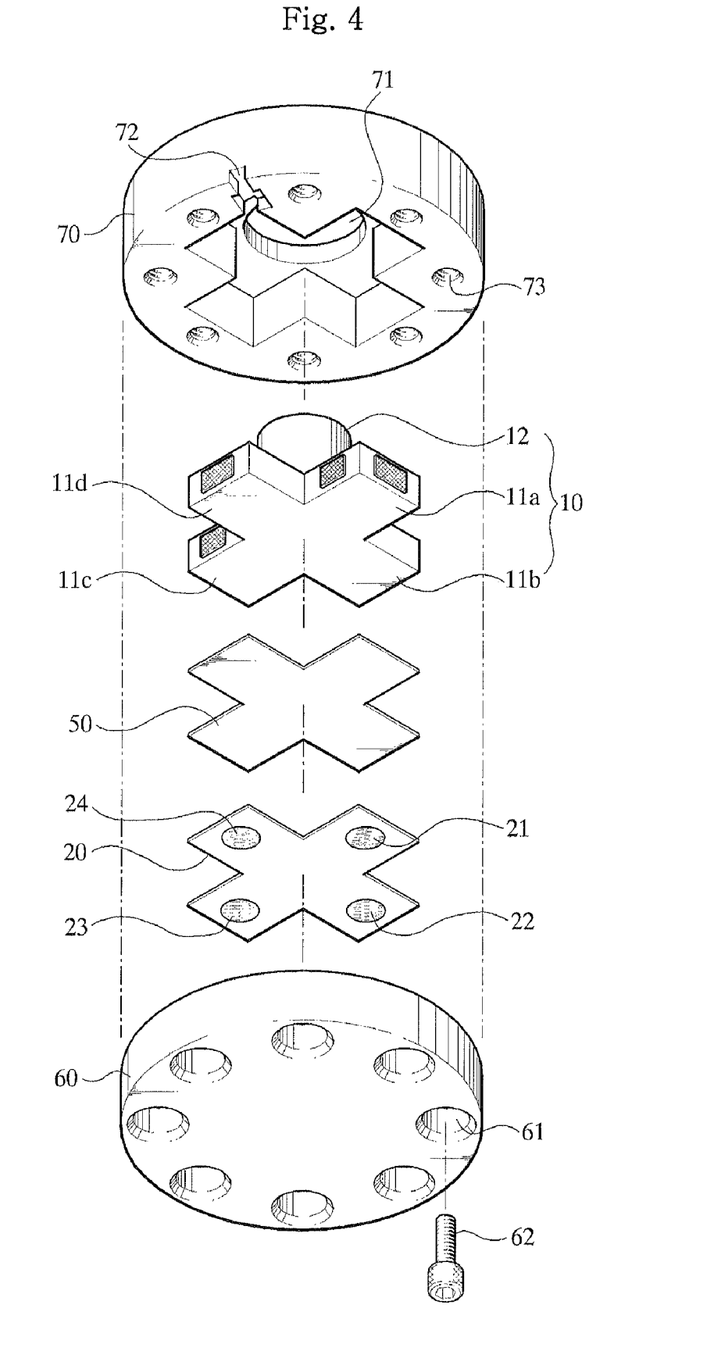
FIG. 4 is an exploded perspective view of the 6-axis force sensor structure according to the first embodiment of the present invention, viewed upward.

FIG. 3 is an exploded perspective view of the 6-axis force sensor structure according to the first embodiment of the present invention, viewed downward, and FIG. 4 is an exploded perspective view of the 6-axis force sensor structure according to the first embodiment of the present invention, viewed upward. Referring to FIGS. 3 and 4, the 6-axis force sensor structure according to the first embodiment of the present invention includes the bumper 10 having the first force sensor film 20 with the distribution of the force sensors 21, 22, 23 and 24, the cross-shaped press member 11 with the horizontal beams 11a, 11b, 11c and 11d, and a bumper axis 12 connected to the top of the press member 11, the force sensor films 31, 32, 33, 34, 41, 42, 43 and 44 located at the ends and sides of the horizontal beams 11a, 11b, 11c and 11d, a pad 50 protecting the first force sensor film 20, a lower plate 60 and an upper plate 70 which serve as a case of the first force sensor film 20. Here, the 6-axis force sensor structure according to the first embodiment of the present invention may further include bolts 62 for combining the lower plate 60 and the upper plate 70 with each other.

In the 6-axis force sensor structure according to the first embodiment of the present invention, a compressive force corresponding to an external force is applied through the bumper and transferred to the force sensors 21, 22, 23 and 24 distributed in the first force sensor film 20. The force sensors 21, 22, 23 and 24 generate electric signals corresponding to the compressive force and output the electric signals to an external calculating means (not shown) such that forces and moments can be detected based on the electric signals.

The first force sensor film 20 has a configuration described above with reference to FIG. 1.

The bumper 10 includes the cross-shaped press member pressing the first force sensor film 20 downward and the bumper axis 12 connected to the top of the press member 11 to transfer an external force to the press member 11. The first force sensor film 20 may be fitted to the bottom face of the press member 11 and have the same cross shape as the press member 11. Further, the press member 11 and the bumper axis 12 of the bumper 10 may be integrated with each other and made of a metal with high rigidity (for example, steel, aluminum or brass) through die casting or made of a polymer such as engineering plastics through injection molding.

The pad 50 is located between the press member 11 and the first force sensor film 20 and protects the first force sensor film 20 from an external impact. The pad 50 may be formed using a polymer material or silicon with low rigidity.

The lower plate 60 is located under the first force sensor film 20 and reacts upon an external force. In addition, the lower plate 60 is combined with the upper plate 70 to function as a case receiving the first force sensor film 20 and the bumper 10. Further, the lower case 50 has a plurality of screw holes 61 with screw threads, which correspond to screw holes 73 of the upper plate 70. The bolts 62 are fitted into the screw holes 61 of the lower plate 60 and the screw holes 73 of the upper plate 70 to combine the lower plate 60 and the upper plate 70 with each other.

The upper plate 70 comes into contact with the lower plate 60 at the edges thereof and includes a first hole 71 through which the top end of the bumper axis 12 is projected to the outside and a second hole 72 through which a signal input/output line (not shown) connected to the first force sensor film 20 is drawn out. The upper plate 70 is located on the bumper 10 and receives the first force sensor film 20 and the bumper 10. The second hole 72 may be formed at the side of the upper plate 70 or may be formed according to combination of the upper plate 70 and the lower plate 60. To enhance the adhesive strength of the lower plate 60 and the upper plate 70 when the lower plate 60 and the upper plate 70 are combined with each other, the lower plate 60 and the upper plate 70 may be bonded to each other using an adhesive applied to adhesive faces of the lower plate 60 and the upper plate 70 in addition to the bolts 62. A synthetic resin such as epoxy resin may be used as the adhesive.

Both the lower plate 60 and the upper plate 70 may be manufactured using a metal with high rigidity (for example, steel, aluminum or brass) through die casting or formed of a polymer such as engineering plastics through injection molding.

Figure 5:
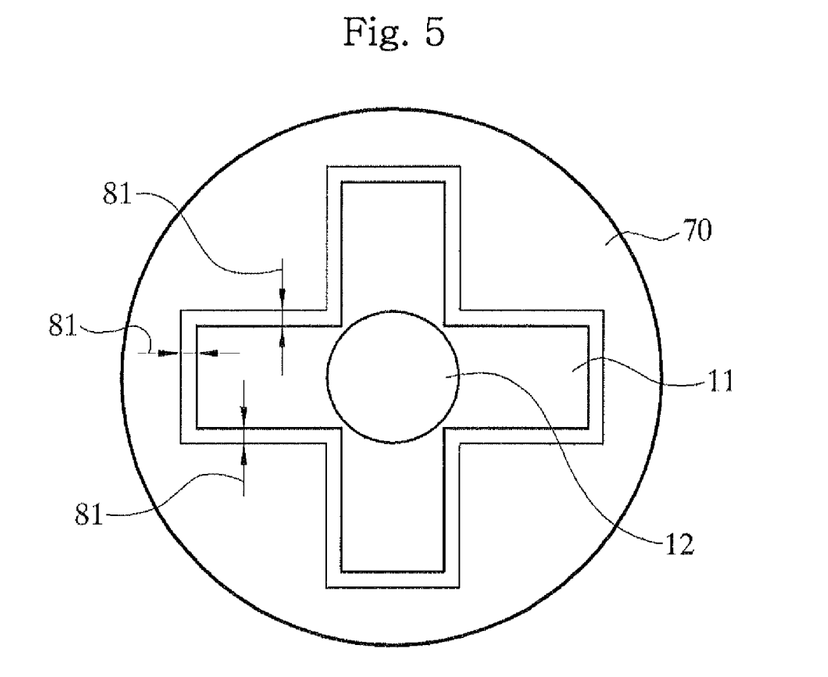
FIG. 5 is a plan view roughly showing an assembled state of components of the 6-axis force sensor structure according to the first embodiment of the present invention.
Figure 6:
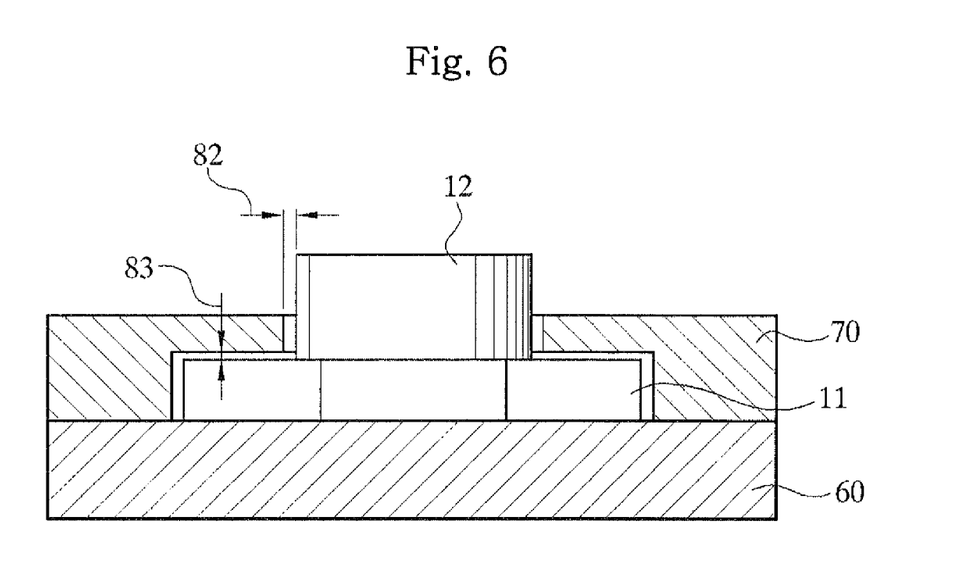
FIG. 6 is a cross-sectional view roughly showing the assembled state of the components of the 6-axis force sensor structure according to the first embodiment of the present invention.

FIG. 5 is a plan view roughly showing an assembled state of components of the 6-axis force sensor structure according to the first embodiment of the present invention and FIG. 6 is a cross-sectional view roughly showing the assembled state of the components of the 6-axis force sensor structure according to the first embodiment of the present invention. Referring to FIGS. 5 and 6, the inner side of the upper plate 70 has a recessed structure fitted to the press member 11 and the bumper axis 12. The vertical face of the outer side of the press member 11 forms a first gap 81 of 0.1 mm or more with the vertical face of the inner side of the upper plate 70, which faces the vertical face of the outer side of the press member 11. The vertical face of the outer side of the bumper axis 12 forms a second gap 82 of 0.1 mm or more with the vertical face of the inner side of the upper plate 70, which faces the vertical face of the outer side of the bumper axis 12.

Further, the horizontal face of the outer side of the press member 11, which faces the horizontal face of the inner side of the upper plate 70, forms a third gap 83 of 0.1 mm or more with the horizontal face of the inner side of the upper plate 70. The first, second and third gaps 81, 82 and 83 are used to prevent friction between the upper plate 70 and the bumper 10 and correctly measure forces and moments.

Second Embodiment

Figure 7:
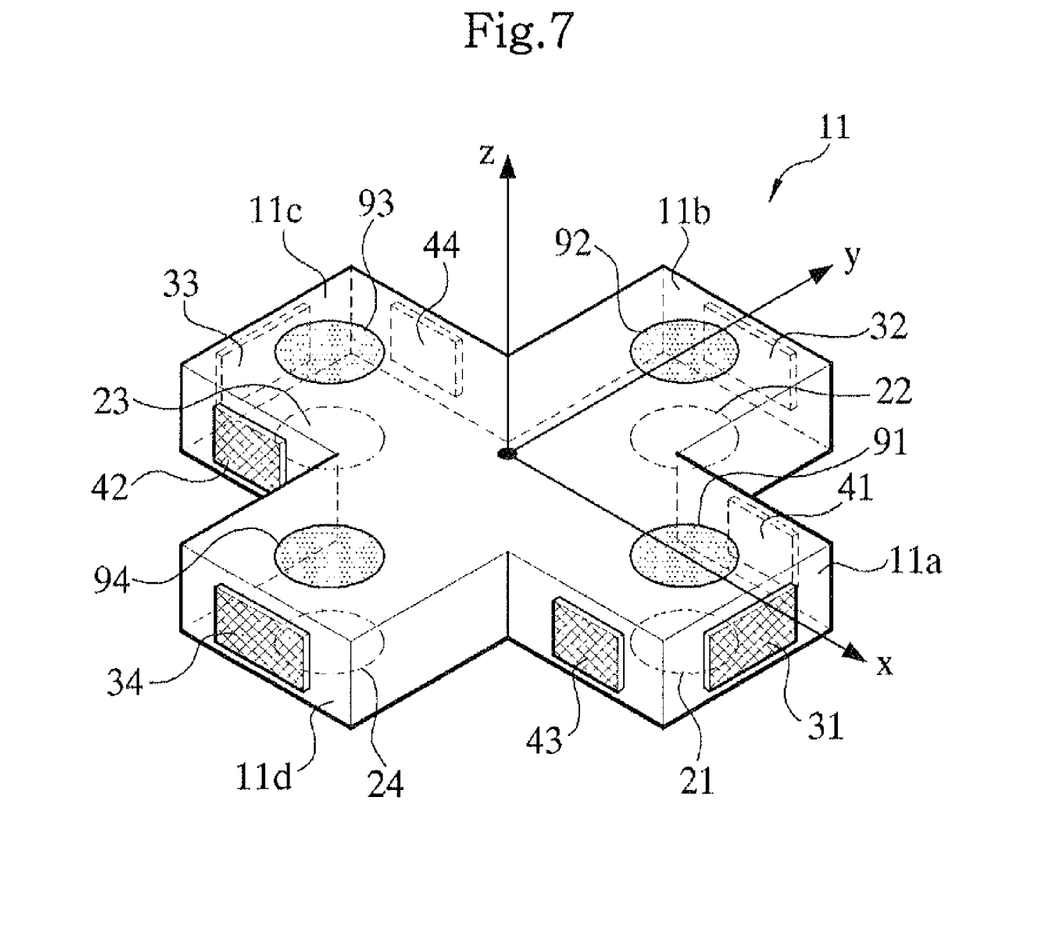
FIG. 7 shows location of force sensor films on the press member of the cross-shaped bumper of the 6-axis force sensor structure according to a second embodiment of the present invention.

FIG. 7 shows location of force sensor films on the press member 11 of the cross-shaped bumper 10 of a 6-axis force sensor structure according to a second embodiment of the present invention. Referring to FIG. 7, a force sensor film 90 having force sensors 91, 92, 93 and 94 respectively placed on the top faces of the horizontal beams 11*a*, 11*b*, 11*c* and 11*d* of the press member 11 is added to the force sensor films 20, 31, 32, 33, 34, 41, 42, 43 and 44 in the first embodiment of the invention shown in FIG. 2. This configuration according to the second embodiment of the invention is for calculating the magnitude of an external force applied to the bumper 10 in consideration of a tensile force when the external force includes the tensile force in addition to a compressive force.

Figure 8:
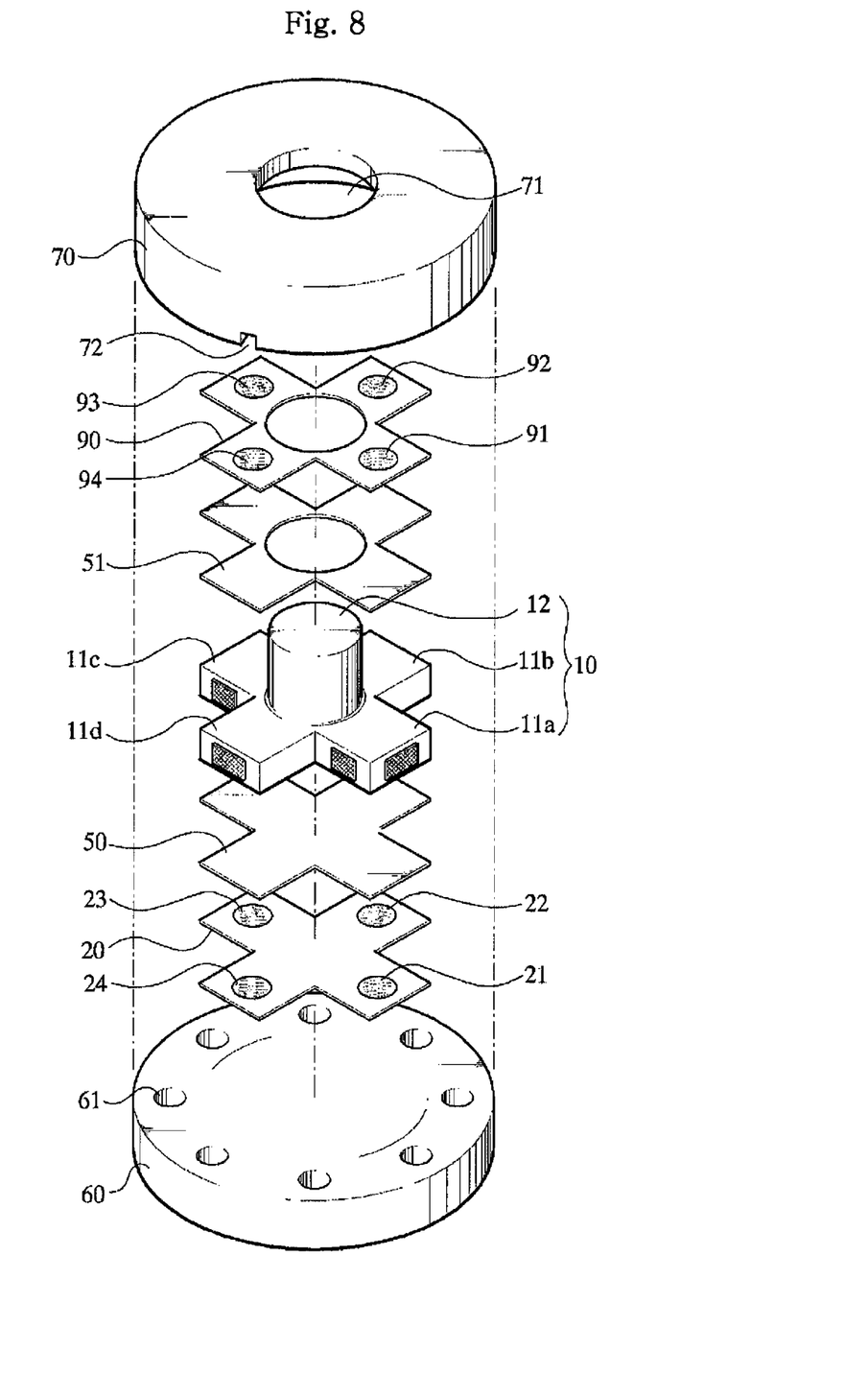
FIG. 8 is an exploded perspective view of the 6-axis force sensor structure according to the second embodiment of the present invention, viewed downward.

FIG. 8 is an exploded perspective view of the 6-axis force sensor structure according to the second embodiment of the present invention, viewed downward. The 6-axis force sensor structure according to the second embodiment of the present invention is identical to the 6-axis force sensor structure according to the first embodiment of the present invention except that the tenth force sensor film 90 and a pad 51 for protecting the tenth force sensor film 90 are added to the 6-axis force sensor structure according to the second embodiment of the invention. Referring to FIG. 8, the tenth force sensor film 90 having a cross shape is located between the upper plate 70 and the top face of the press member 11 and has the force sensors 91, 92, 93 and 94 distributed in at least four ranges. Here, the force sensors 91, 92, 93 and 94 are arranged above the force sensors 21, 22, 23 and 24 of the first force sensor film 20 and respectively correspond to the force sensors 21, 22, 23 and 24 for measurement of forces and moments.

In the second embodiment, the first and tenth force sensor films 20 and 90 respectively have four force sensor distributions in directions perpendicular to each other, which will be explained in detail later with reference to FIG. 10.

<Method of Measuring 3-Axis Forces and 3-Axis Moments>

<Measurement Method According to First Embodiment>

Figure 9:
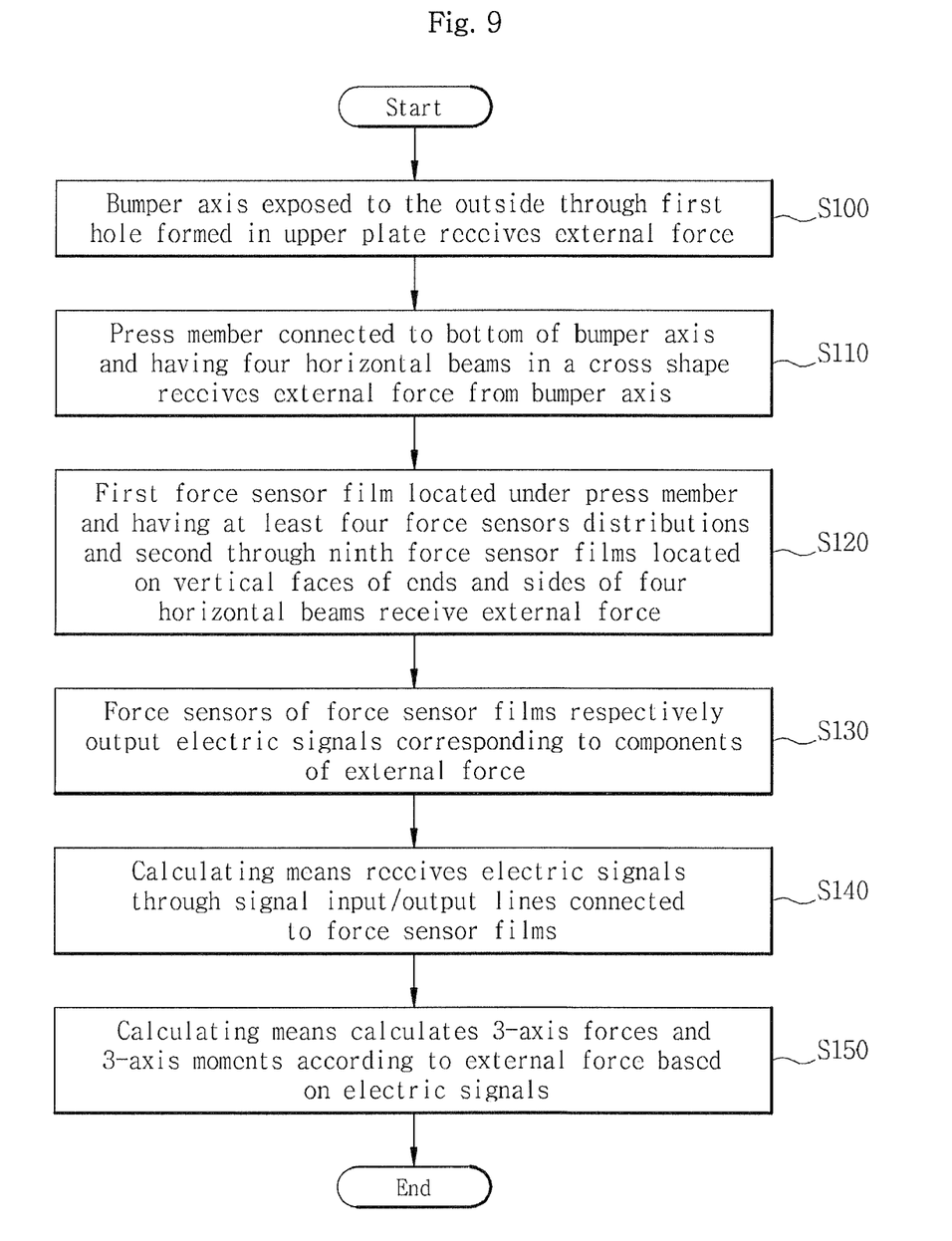
FIG. 9 is a flowchart showing a method of measuring forces of 3 axes and the moments of 3 axes according to a first embodiment of the present invention.

FIG. 9 is a flowchart showing a method of measuring 3-axis forces and 3-axis moments according to a first embodiment of the present invention. Referring to FIG. 9, the bumper axis 12 exposed to the outside through the first hole 71 formed in the upper plate 70 receives an external force in step S100.

The press member 11 that is connected to the bottom of the bumper axis 12 and has the four horizontal beams 11*a*, 11*b*, 11*c* and 11*d* in a cross shape receives the external force from the bumper axis 12 in step S110.

Then, the first force sensor film 20, which is located under the press member 11 and has at least four force sensor distributions, and the second through ninth force sensor films 31, 32, 33, 34, 41, 42, 43 and 44 respectively located on the vertical faces of the ends and the sides of the four horizontal beams 11*a*, 11*b*, 11*c* and 11*d* receive the external force in step S120.

Subsequently, the force sensors of the force sensor films 20, 31, 32, 33, 34, 41, 42, 43 and 44 respectively output electric signals corresponding to components of the external force in step S130.

A calculating means receives the electric signals through signal input/output lines connected to the force sensor films 20, 31, 32, 33, 34, 41, 42, 43 and 44 in step S140.

The calculating means calculates 3-axis forces and 3-axis moments according to the external force based on the electric signals in step S150. In this manner, the method of measuring forces and moments according to the 6-axis force sensor structure is performed.

When the calculating means calculates a uniaxial force in the step S150, the calculating means calculates Fz according to Equation 1.

$$Fz = F_1 + F_2 + F_3 + F_4 \qquad \text{[Equation 1]}$$

Here, Fz represents the magnitude of force in the axial direction of the bumper axis 12 and $F_1$, $F_2$, $F_3$ and $F_4$ respectively denote magnitudes of forces applied to the force sensors 21, 22, 23 and 24 of the first force sensor film 20.

Further, when calculating 2-axis moments in the step S150, the calculating means calculates Mx and My according to Equations 2 and 3.

$$Mx = (F_4 - F_2)a \qquad \text{[Equation 2]}$$

$$My = (F_1 - F_3)b \qquad \text{[Equation 3]}$$

Here, Mx represents the magnitude of moment based on an arbitrary X-axis formed by the horizontal beams 11*a* and 11*c* having the same central axis among the four horizontal beams 11a, 11b, 11c and 11d, $F_4$ and $F_2$ respectively denote the magnitudes of forces applied to the fourth force sensor 24 and the second force sensor 22 which are arranged symmetrically based on the center of the bumper axis 12 on the first force sensor film 20, and a represents a distance between the center of the bumper axis 12 and the second force sensor 22. In addition, My denotes the magnitude of moment based on a y-axis, which is perpendicular to the x-axis and is formed by the horizontal beams 11b and 11d among the four horizontal beams 11a, 11b, 11c and 11d, $F_1$ and $F_3$ respectively denote the magnitudes of forces applied to the first force sensor 21 and the third force sensor 23 which are arranged symmetrically based on the center of the bumper axis 12 and perpendicularly to a line connecting the fourth force sensor 24 and the second force sensor 22, and b represents a distance between the center of the bumper axis 12 and the first force sensor 21.

When calculating 2-axis forces in the step S150, the calculating means calculates Fx and Fy according to Equations 4 and 5.

$$Fx = F_9 - F_{10} \quad \text{[Equation 4]}$$

$$Fy = F_{11} - F_{12} \quad \text{[Equation 5]}$$

Here, Fx represents the magnitude of force applied to an x-axis formed by the horizontal beams 11a and 11c having the same central axis in the length direction among the four horizontal beams 11a, 11b, 11c and 11d, and $F_9$ and $F_{10}$ respectively denote the magnitudes of forces applied to the force sensor films 31 and 33 which are located on the vertical faces of both ends of the x-axis and face each other. In addition, Fy represents the magnitude of force applied to a y-axis, which is perpendicular to the x-axis and is formed by the horizontal beams 11b and 11d among the four horizontal beams 11a, 11b, 11c and 11d, and $F_{11}$ and $F_{12}$ respectively denote the magnitudes of forces applied to the force sensor films 32 and 34 which are located on the vertical faces of both ends of the y-axis and face each other.

Furthermore, when calculating uniaxial moment in the step S150, the calculating means calculates Mz according to Equation 6.

$$Mz = (F_{13} - F_{15})a + (F_{14} - F_{16})a \quad \text{[Equation 6]}$$

Here, Mz represents the magnitude of moment having the center of the bumper axis 12 as a z-axis, and $F_{13}$, $F_{14}$, $F_{15}$ and $F_{16}$ respectively denote the magnitudes of forces applied to the force sensor films 41, 42, 43 and 44 respectively located on the vertical faces of the sides of the horizontal beams 11a and 11c having the same central axis in the length direction among the fourth horizontal beams 11a, 11b, 11c and 11d. $F_{13}$ and $F_{15}$ have lines of action, which correspond to each other, and $F_{14}$ and $F_{16}$ have lines of actions, which correspond to each other. In addition, a represents a distance between the bumper axis 12 and the centers of the force sensor films 41, 42, 43 and 44.

According to Equations 1 through 6, the magnitudes of forces of 3 axes and the magnitudes of moments of 3 axes are derived.

<Measurement Method According to Second Embodiment>

Figure 10:
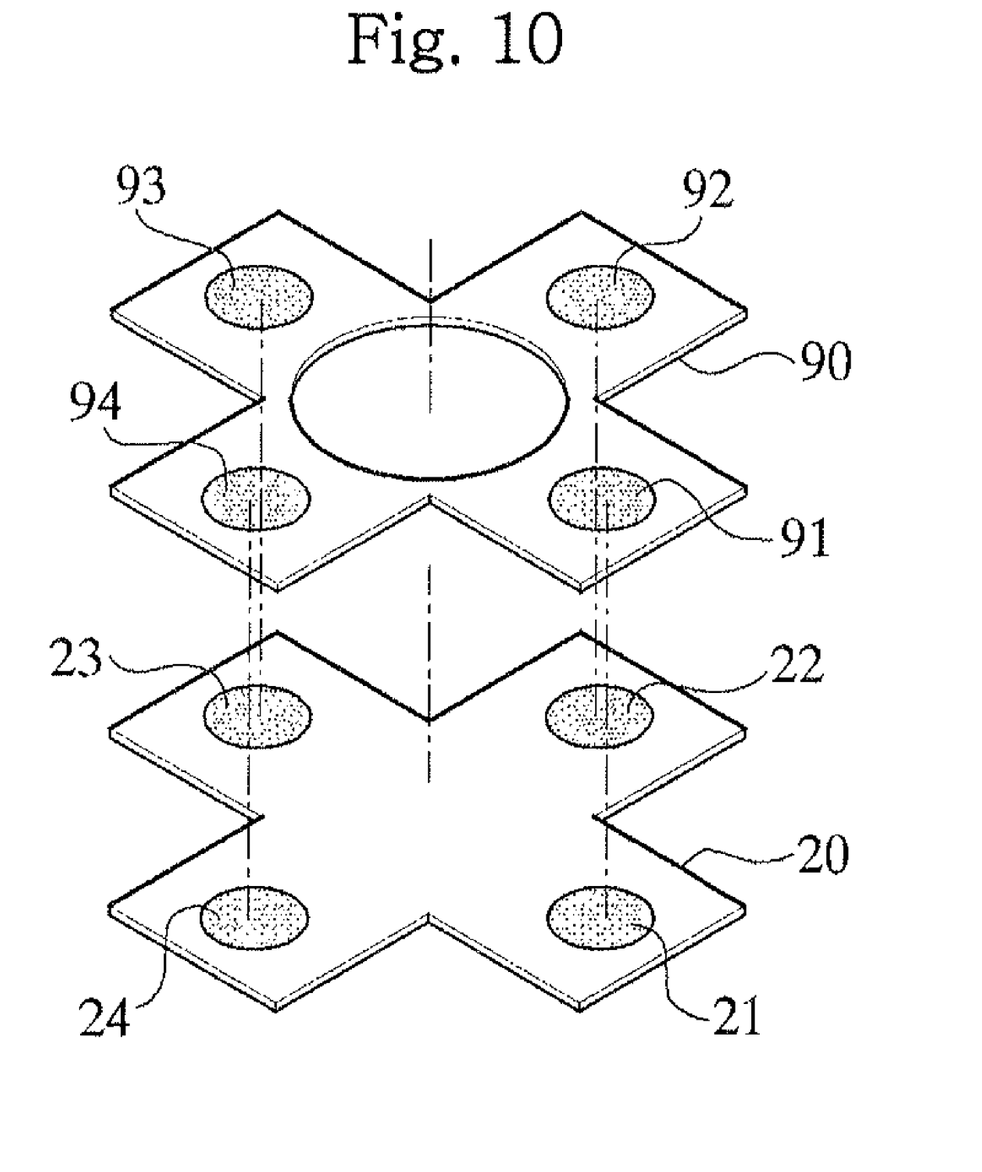
FIG. 10 is a perspective view showing force sensor distributions and mutual position relationship of a first force sensor film and a tenth force sensor film of the 6-axis force sensor structure according to the second embodiment of the present invention.

FIG. 10 is a perspective view showing force sensor distributions and mutual position relationship of the first force sensor film 20 and the tenth force sensor film 90 of the 6-axis force sensor structure according to the second embodiment of the present invention. While the first force sensor film 20 and the tenth force sensor film 90 can have four or more force sensor distributions in the present invention, the first force sensor film 20 and the tenth force sensor film 90 respectively have four force sensor distributions in the second embodiment, as shown in FIG. 10.

The first force sensor film 20 has the four force sensors 21, 22, 23 and 24 distributed in four regions corresponding to directions perpendicular to each other and the tenth force sensor film 90 has the four force sensors 41, 42, 43 and 44 distributed in four regions corresponding to directions perpendicular to each other. Here, each of electric signals, output from the respective force sensors according to a compressive force and a tensile force, corresponds to a difference between forces canceling each other (for example, a difference between a compressive force of F1 applied to the force sensor 21 and a tensile force of F5 applied to the force sensor 91 is calculated as F1-F5), and thus the first force sensor film and the tenth force sensor film 90 must have force sensor distributions in the same positions in the vertical direction.

Figure 11:
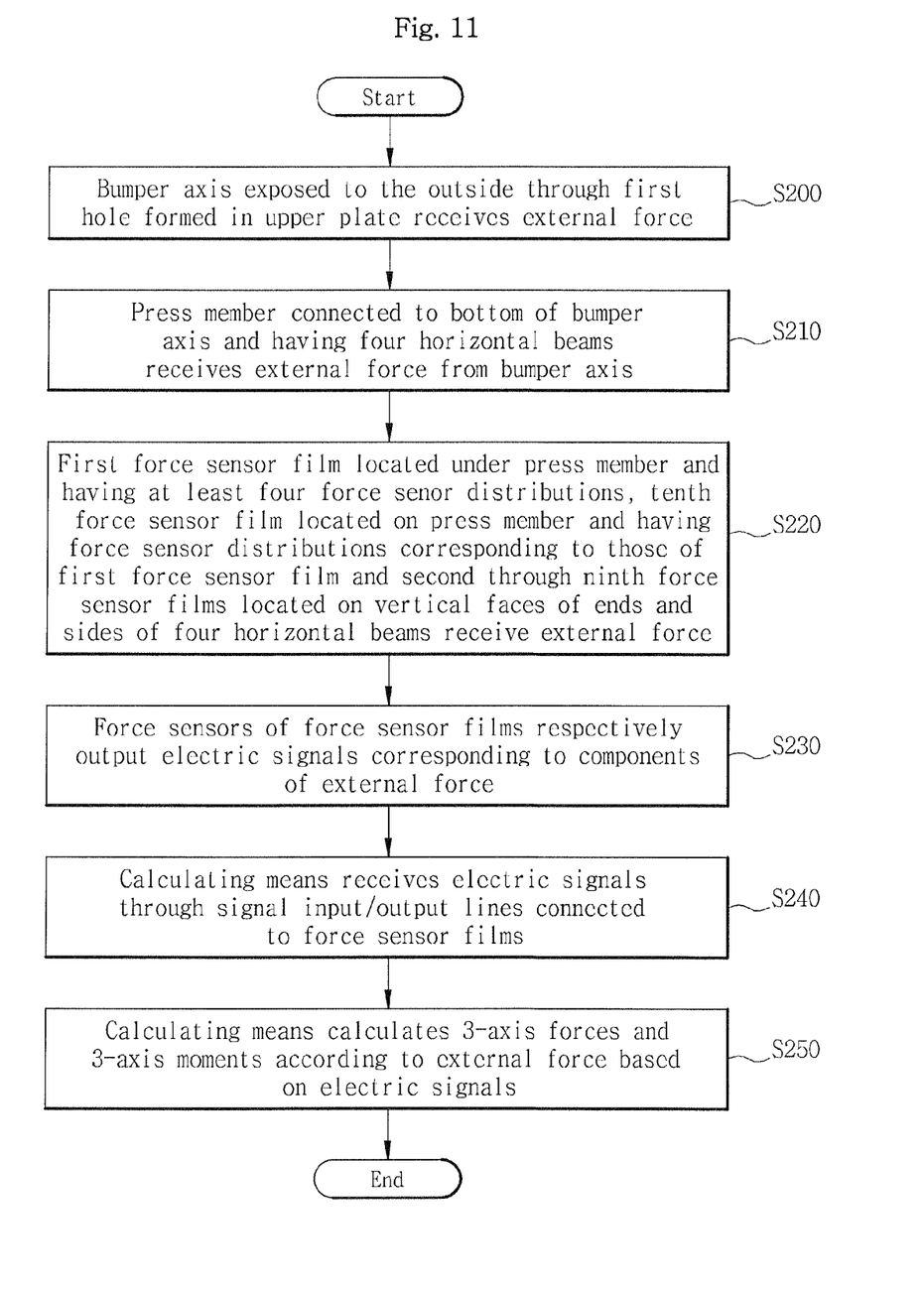
FIG. 11 is a flowchart showing a method of measuring forces of 3 axes and the moments of 3 axes according to a second embodiment of the present invention.

FIG. 11 is a flowchart showing a method of measuring 3-axis forces and 3-axis moments according to a second embodiment of the present invention. Referring to FIG. 11, the bumper axis 12 exposed to the outside through the first hole 71 formed in the upper plate 70 receives an external force in step S200.

The press member 11 which is connected to the bottom of the bumper axis 11 and has the four horizontal beams 11a, 11b, 11c and 11d in a cross shape receives the external force from the bumper axis 12 in step S210.

Then, the first force sensor film 20 which is located under the press member 11 and has at least four force sensors 21, 22, 23 and 24, the tenth force sensor film 90 which is located on the press member 11 and has the same force sensor distributions as those of the first force sensor film 20, and the second through ninth force sensor films 31, 32, 33, 34, 41, 42, 43 and 44 respectively placed on the vertical faces of the ends and the vertical faces of the sides of the four horizontal beams 11a, 11b, 11c and 11d receive the external force in step S220.

Force sensors of the force sensor films 20, 31, 32, 33, 34, 41, 42, 43, 44 and 90 respectively output electric signals corresponding to components of the external force in step S230.

A predetermined calculating means receives the electric signals through signal input/output lines connected to the force sensor films 20, 31, 32, 33, 34, 41, 42, 43, 44 and 90 in step S240.

Then, the calculating means calculates 3-axis forces and 3-axis moments according to the external force based on the electric signals in step S250. In this manner, the method of measuring forces and moments is performed.

When the external force is a compressive force or a tensile force applied to the bumper axis 12 and the calculating means calculates a uniaxial force in the step S250, the calculating means calculates $F_{-z}$ or $F_{+z}$ according to Equations 7 and 8.

$$F_{-z} = F_1 + F_2 + F_3 + F_4 \quad \text{[Equation 7]}$$

$$F_{+z} = F_5 + F_6 + F_7 + F_8 \quad \text{[Equation 8]}$$

Here, $F_{-z}$ represents the magnitude of force in a compressive direction of the bumper axis 12 and $F_1$, $F_2$, $F_3$ and $F_4$ respectively denote the magnitudes of forces applied to the force sensors 21, 22, 23 and 24 on the first force sensor film 20. In addition, $F_{+z}$ represents the magnitude of force in a tensile direction of the bumper axis 12 and $F_5$, $F_6$, $F_7$ and $F_8$ respectively denote the magnitudes of forces applied to the force sensors 91, 92, 93 and 94 on the tenth force sensor film 90.

When the external force corresponds to a compressive force or a tensile force applied to the bumper axis 12 and the calculating means calculates 2-axis moments in the step S250, the calculating means calculates Mx and My according to Equations 9 and 10.

$$Mx=(F_4-F_2)a+(F_6-F_8)a \quad \text{[Equation 9]}$$

$$My=(F_1-F_3)a+(F_7-F_5)a \quad \text{[Equation 10]}$$

Here, Mx represents the magnitude of moment based on an x-axis formed by the horizontal beams 11a and 11c having the same central axis among the four horizontal beams 11a, 11b, 11c and 11d, and $F_1$, $F_2$, $F_3$ and $F_4$ respectively denote the magnitudes of forces applied to the first, second, third and fourth force sensors 21, 22, 23 and 24 which are arranged on the first force sensor film 20 at an equal distance a from the center of the bumper axis 10 and at an equal angle of 90°. Further, My represents the magnitude of moment based on a y-axis, which is perpendicular to the x-axis and is formed by the horizontal beams 11b and 11d among the four horizontal beams 11a, 11b, 11c and 11d, and $F_5$, $F_6$, $F_7$ and $F_8$ respectively denote the magnitudes of forces applied to the fifth, sixth, seventh and eighth force sensors 91, 92, 93 and 94 which are arranged on the tenth force sensor film 90 at the equal distance a from the center of the bumper axis 12 and at an equal angle of 90° and respectively correspond to the first, second, third and fourth force sensors 21, 22, 23 and 23 in the vertical direction. An angle between a line connecting the center of the bumper axis 12 and one of the force sensors 91, 92, 93 and 94 and a line connecting the center of the bumper axis 12 and the neighboring force sensor corresponds to 90°.

The magnitudes of uniaxial force and 2-axis moments are derived according to Equations 7, 8, 9 and 10. 2-axis forces and uniaxial moment are obtained by calculating Fx, Fy and Mz based on Equations 4, 5 and 6 according to the calculating means through the same method as the first embodiment. In this manner, all of 3-axis forces and 3-axis moments are obtained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A 6-axis force sensor structure using a force sensor, which has 3-axis force directions and 3-axis moment directions, comprising:
    a bumper 10 including a bumper axis 12 receiving an external force and a press member 11 which has four horizontal beams 11a, 11b, 11c and 11d in a cross shape, is connected to the bottom of the bumper axis 12 and receives the external force;
    a force sensor film for measuring uniaxial force and 2-axial moments, which is composed of a first force sensor film 20 that is located under the press member 11 and has force sensors 21, 22, 23 and 24 distributed in at least four regions;
    a force sensor film for measuring 2-axis forces, which is composed of second, third, fourth and fifth force sensor films 31, 32, 33 and 34 that are respectively located on the vertical faces of the ends of the four horizontal beams 11a, 11b, 11c and 11d and respectively have individual force sensor distributions;
    a force sensor film for measuring uniaxial moment, which is composed of sixth, seventh, eighth and ninth force sensor films 41, 42, 43 and 44 that are respectively located on the vertical faces of the sides of the two horizontal beams 11a and 11c having the same central axes among the four horizontal beams 11a, 11b, 11c and 11d and respectively have individual force sensor distributions;
    a pad 50 located between the press member 11 and the first force sensor film 20;
    a lower plate 60 which is located under the first force sensor film 20 and reacts upon the external force; and
    an upper plate 70 which comes into contact with the lower plate 60 at the edges thereof, has a first hole 71 for exposing the top of the bumper axis 12 to the outside and a second hole 72 through which signal input/output lines connected to the force sensor films 20, 31, 32, 33, 34, 41, 42, 43 and 44 are drawn out, and is located on the bumper 10 to receive the force sensor films 20, 31, 32, 33, 34, 41, 42, 43 and 44 and the bumper 10, having a predetermined gap between the upper plate 70 and the force sensor films 20, 31, 32, 33, 34, 41, 42, 43 and 44 and the bumper 10.

2. The 6-axis force sensor structure of claim 1, wherein the upper plate 70 and the lower plate 60 are manufactured using a metal or a polymer.

3. The 6-axis force sensor structure of claim 1, wherein the first force sensor film 20 has the four force sensors 21, 22, 23 and 24 respectively arranged in directions perpendicular to each other.

4. The 6-axis force sensor structure of claim 1, wherein the force sensor films 20, 31, 32, 33, 34, 41, 42, 43 and 44 are contact resistant films, capacitive films or piezoelectric films.

5. The 6-axis force sensor structure of claim 1, wherein the bumper 10 is made of a metal or a polymer.

6. The 6-axis force sensor structure of claim 1, wherein the pad 50 is a silicon pad or a polymer pad.

7. The 6-axis force sensor structure of claim 1, wherein the upper plate 70 is combined with the lower plate 60 using bolts 61 fitted into a plurality of screw holes formed at the edge of the lower plate 60 or adheres to the bottom plate 70 using an adhesive.

8. The 6-axis force sensor structure of claim 1, wherein the upper plate 70 has a recessed structure fitted to the shapes of the press member 11 and the bumper axis 12, the vertical face of the outer side of the press member 11 forms a first gap 81 with the vertical face of the inner side of the upper plate 70, which faces the vertical face of the outer side of the press member 11, the vertical face of the outer side of the bumper axis 12 forms a second gap 82 with the vertical face of the inner side of the upper plate 70, which faces the vertical face of the outer side of the bumper axis 12, and the horizontal face of the outer side of the press member 11, which faces the horizontal face of the inner side of the upper plate 70, forms a third gap 83 with the horizontal face of the inner side of the upper plate 70.

9. The 6-axis force sensor structure of claim 8, wherein the first gap 81 and the second gap 82 correspond to 0.1 mm or more.

10. The 6-axis force sensor structure of claim 8, wherein the third gap 83 corresponds to 0.1 mm or more.

11. The 6-axis force sensor structure of claim 8, wherein the first force sensor film 20 is fitted to the bottom face of the press member 11 and has the same size as the bottom face of the press member 11.

12. The 6-axis force sensor structure of claim 1, wherein the force sensor film for measuring 1-axial force and 2-axis moments further comprises a tenth force sensor film 90 which is located between the upper plate 70 and the top face of the press member 11 and has force sensors 91, 92, 93 and 94 distributed in at least four regions.

13. The 6-axis force sensor structure of claim 12, wherein the tenth force sensor film 90 has the force sensors 91, 92, 93 and 94 respectively arranged in directions perpendicular to each other, and the force sensor distributions of the first force sensor film 10 vertically correspond to the force sensor distributions of the tenth force sensor film 90.

14. A method of measuring forces and moments according to a 6-axis force sensor structure, comprising:
   a first transfer step S100 in which a bumper axis 12 exposed to the outside through a first hole 71 formed in an upper plate 70 receives an external force;
   a second transfer step S110 in which a press member 11 which is connected to the bottom of the bumper axis 12 and has four horizontal beams 11a, 11b, 11c and 11d in a cross shape receives the external force from the bumper axis 12;
   a third transfer step S120 in which a first force sensor film 20 which is located under the press member 11 and has at least four force sensor distributions and second through ninth force sensor films 31, 32, 33, 34, 41, 42, 43 and 44 respectively located on the vertical faces of the ends and the vertical faces of the sides of the four horizontal beams 11a, 11b, 11c and 11d receive the external force;
   a step S130 in which force sensors of the force sensor films 20, 31, 32, 33, 34, 41, 42, 43 and 44 respectively output electric signals corresponding components of the external force;
   a step S140 in which a calculating means receives the electric signals through signal input/output lines connected to the force sensor films 20, 31, 32, 33, 41, 42, 43 and 44; and
   a step S150 in which the calculating means calculates 3-axis forces and 3-axis moments according to the external force based on the electric signals.

15. The method of claim 14, wherein, when the calculating means calculates a uniaxial force in the step S150, the calculating means calculates Fz according to the following equation $$Fz = F_1 + F_2 + F_3 + F_4$$

where Fz represents the magnitude of force in the axial direction of the bumper axis 12 and $F_1$, $F_2$, $F_3$ and $F_4$ respectively denote magnitudes of forces applied to force sensors 21, 22, 23 and 24 of the first force sensor film 20.

16. The method of claim 14, wherein, when the calculating means calculates 2-axis moments in the step S150, the calculating means calculates Mx and My according to the following equations $$Mx = (F_4 - F_2)a, \; My = (F_1 - F_3)b$$

where Mx represents the magnitude of moment based on an arbitrary X-axis formed by the horizontal beams 11a and 11c having the same central axis among the four horizontal beams 11a, 11b, 11c and 11d, $F_4$ and $F_2$ respectively denote the magnitudes of forces applied to the fourth force sensor 24 and the second force sensor 22 which are arranged symmetrically based on the center of the bumper axis 12 on the first force sensor film 20, a represents a distance between the center of the bumper axis 12 and the second force sensor 22, My denotes the magnitude of moment based on a y-axis, which is perpendicular to the x-axis and is formed by the horizontal beams 11b and 11d among the four horizontal beams 11a, 11b, 11c and 11d, $F_1$ and $F_3$ respectively denote the magnitudes of forces applied to the first force sensor 21 and the third force sensor 23 which are arranged symmetrically based on the center of the bumper axis 12 and perpendicularly to a line connecting the fourth force sensor 24 and the second force sensor 22, and b represents a distance between the center of the bumper axis 12 and the first force sensor 21.

17. The method of claim 14, wherein, when the calculating means calculates 2-axis forces, the calculating means calculates Fx and Fy according to the following equations $$Fx = F_9 - F_{10}, \; Fy = F_{11} - F_{12}$$

where Fx represents the magnitude of force applied to an x-axis formed by the horizontal beams 11a and 11c having the same central axis in the length direction among the four horizontal beams 11a, 11b, 11c and 11d, $F_9$ and $F_{10}$ respectively denote the magnitudes of forces applied to the force sensor films 31 and 33 which are located on the vertical faces of both ends of the x-axis and face each other, Fy represents the magnitude of force applied to a y-axis, which is perpendicular to the x-axis and is formed by the horizontal beams 11b and 11d among the four horizontal beams 11a, 11b, 11c and 11d, and $F_{11}$ and $F_{12}$ respectively denote the magnitudes of forces applied to the force sensor films 32 and 34 which are located on the vertical faces of both ends of the y-axis and face each other.

18. The method of claim 14, when the calculating means calculates uniaxial moment, the calculating means calculates Mz according to the following equation $$Mz = (F_{13} - F_{15})a + (F_{14} - F_{16})a$$

where Mz represents the magnitude of moment having the center of the bumper axis 12 as a z-axis, $F_{13}$, $F_{14}$, $F_{15}$ and $F_{16}$ respectively denote the magnitudes of forces applied to the force sensor films 41, 42, 43 and 44 respectively located on the vertical faces of the sides of the horizontal beams 11a and 11c having the same central axis in the length direction among the fourth horizontal beams 11a, 11b, 11c and 11d, $F_{13}$ and $F_{15}$ having lines of action, which correspond to each other, $F_{14}$ and $F_{16}$ having lines of actions, which correspond to each other, and a represents a distance between the bumper axis 12 and the centers of the force sensor films 41, 42, 43 and 44.

19. A method of measuring forces and moments according to a 6-axis force sensor structure, comprising:
   a first transfer step S200 in which a bumper axis 12 exposed to the outside through a first hole 71 formed in an upper plate 70 receives an external force;
   a second transfer step S210 in which a press member 11 which is connected to the bottom of the bumper axis 12 and has four horizontal beams 11a, 11b, 11c and 11d in a cross shape receives the external force from the bumper axis 12;
   a third transfer step S220 in which a first force sensor film 20 which is located under the press member 11 and has force sensors 21, 22, 23 and 24 distributed in at least four regions, a tenth force sensor film 90 which is located on the press member 11 and has the same force sensor distribution as that of the first force sensor film 20, and second through ninth force sensor films 31, 32, 33, 34, 41, 42, 43 and 44 respectively located on the vertical faces of the ends and the vertical faces of the sides of the four horizontal beams 11a, 11b, 11c and 11d receive the external force;
   a step S230 in which force sensors of the force sensor films 20, 31, 32, 33, 34, 41, 42, 43, 44 and 90 respectively output electric signals corresponding components of the external force;

a step S240 in which a calculating means receives the electric signals through signal input/output lines connected to the force sensor films 20, 31, 32, 33, 41, 42, 43, 44 and 90; and a step S250 in which the calculating means calculates 3-axis forces and 3-axis moments according to the external force based on the electric signals.

20. The method of claim 19, wherein, when the external force corresponds to a compressive force or a tensile force applied to the bumper axis 12 and the calculating means calculates a uniaxial force in the step S250, the calculating means calculates $F_{-z}$ or $F_{+z}$ according to the following equations $$F_{-z}=F_1+F_2+F_3+F_4, \ F_{+z}=F_5+F_6+F_7+F_8$$

where $F_{-z}$ represents the magnitude of force in a compressive direction of the bumper axis 12, $F_1$, $F_2$, $F_3$ and $F_4$ respectively denote the magnitudes of forces applied to the force sensors 21, 22, 23 and 24 on the first force sensor film 20, $F_{+z}$ represents the magnitude of force in a tensile direction of the bumper axis 12, and $F_5$, $F_6$, $F_7$ and $F_8$ respectively denote the magnitudes of forces applied to the force sensors 91, 92, 93 and 94 on the tenth force sensor film 90.

21. The method of claim 19, wherein, when the external force corresponds to a compressive force or a tensile force applied to the bumper axis 12 and the calculating means calculates 2-axis moments in the step S250, the calculating means calculates Mx and My according to the following equations $$Mx=(F_4-F_2)a+(F_6-F_8)a, \ My=(F_1-F_3)a+(F_7-F_5)a$$

where Mx represents the magnitude of moment based on an x-axis formed by the horizontal beams 11a and 11c having the same central axis among the four horizontal beams 11a, 11b, 11c and 11d, $F_1$, $F_2$, $F_3$ and $F_4$ respectively denote the magnitudes of forces applied to the first, second, third and fourth force sensors 21, 22, 23 and 24 which are arranged on the first force sensor film 20 at an equal distance a from the center of the bumper axis 10 and at an equal angle of 90°, My represents the magnitude of moment based on a y-axis, which is perpendicular to the x-axis and is formed by the horizontal beams 11b and 11d among the four horizontal beams 11a, 11b, 11c and 11d, and $F_5$, $F_6$, $F_7$ and $F_8$ respectively denote the magnitudes of forces applied to the fifth, sixth, seventh and eighth force sensors 91, 92, 93 and 94 which are arranged on the tenth force sensor film 90 at the equal distance a from the center of the bumper axis 12 and at an equal angle of 90° and respectively correspond to the first, second, third and fourth force sensors 21, 22, 23 and 23 in the vertical direction.

22. The method of claim 19, wherein, when the calculating means calculates 2-axis forces in the step S250, the calculating means calculates Fx and Fy according to the following equations $$Fx=F_9-F_{10}, \ Fy=F_{11}-F_{12}$$

where Fx represents the magnitude of force applied to an x-axis formed by the horizontal beams 11a and 11c having the same central axis in the length direction among the four horizontal beams 11a, 11b, 11c and 11d, $F_9$ and $F_{10}$ respectively denote the magnitudes of forces applied to the force sensor films 31 and 33 which are located on the vertical faces of both ends of the x-axis and face each other, Fy represents the magnitude of force applied to a y-axis, which is perpendicular to the x-axis and is formed by the horizontal beams 11b and 11d among the four horizontal beams 11a, 11b, 11c and 11d, and $F_{11}$ and $F_{12}$ respectively denote the magnitudes of forces applied to the force sensor films 32 and 34 which are located on the vertical faces of both ends of the y-axis and face each other.

23. The method of claim 19, when the calculating means calculates uniaxial moment in the step S250, the calculating means calculates Mz according to the following equation $$Mz=(F_{13}-F_{15})a+(F_{14}-F_{16})a$$

where Mz represents the magnitude of moment having the center of the bumper axis 12 as a z-axis, $F_{13}$, $F_{14}$, $F_{15}$ and $F_{16}$ respectively denote the magnitudes of forces applied to the force sensor films 41, 42, 43 and 44 respectively located on the vertical faces of the sides of the horizontal beams 11a and 11c having the same central axis in the length direction among the fourth horizontal beams 11a, 11b, 11c and 11d, $F_{13}$ and $F_{15}$ having lines of action, which correspond to each other, $F_{14}$ and $F_{16}$ having lines of actions, which correspond to each other, and a represents a distance between the bumper axis 12 and the centers of the force sensor films 41, 42, 43 and 44.

* * * * *